Jan. 4, 1944. K. A. S. KARLSTRÖM 2,338,437
DENTAL INSTRUMENT FOR BORING, GRINDING, AND LIKE OPERATIONS
Filed July 13, 1940
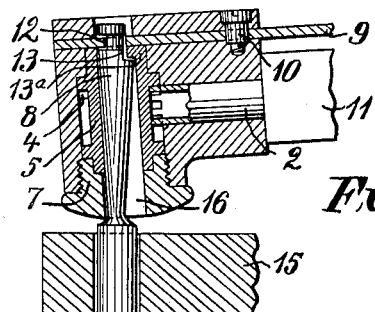
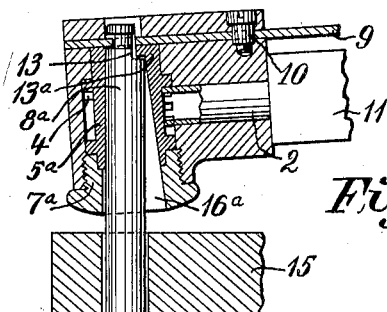
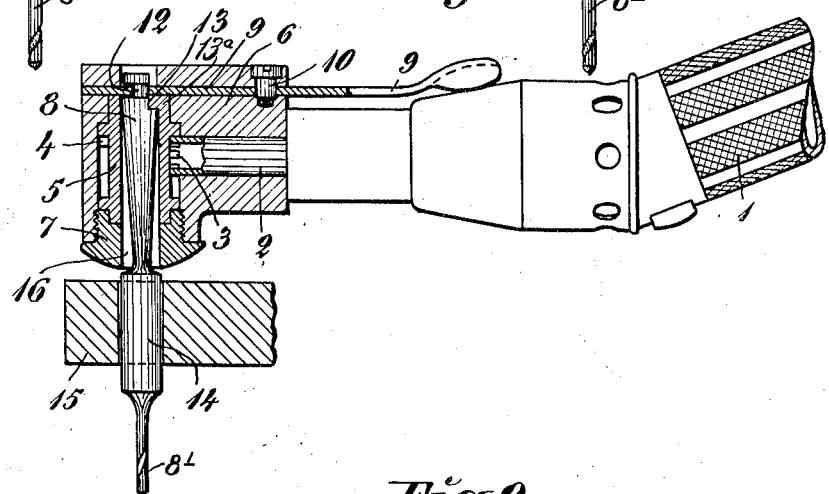
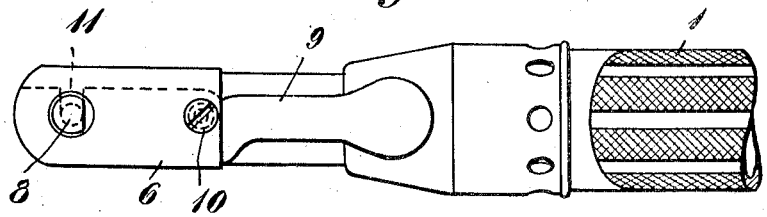
Inventor
K. A. S. Karlström
By Glascock Downing & Seebold
Attys.

Patented Jan. 4, 1944

2,338,437

UNITED STATES PATENT OFFICE 2,338,437

DENTAL INSTRUMENT FOR BORING, GRINDING, AND LIKE OPERATIONS

Karl Axel Sam Karlström, Gavle, Sweden

Application July 13, 1940, Serial No. 345,394
In Sweden April 24, 1940

3 Claims. (Cl. 32—27)

The present invention refers to such dental instruments for boring, grinding and like operations, or so-called hand pieces or angle pieces, which consist of a handle and of motion transmitting members extended through the handle to transfer a rotary movement onto the tool. The object of the invention is to facilitate the manipulation of the instrument, particularly in the boring of mutually parallel pin holes. In this kind of work, use is generally made of a guiding means for parallel guidance of the bore bit, the latter being then guided in a guiding sleeve which permits of being adjusted to various positions while maintaining the parallelism between the axis of the guiding sleeve and an axis which is fixed relatively to the teeth. This guiding means may readily become subjected to fairly great bending forces through unintentional movements of the hand, whereby the accuracy of the boring work is jeopardized. This disadvantage is avoided according to the present invention by an arrangement which makes it possible to relieve the guiding means of such laterally directed forces that may cause bendings in the guiding means. The invention substantially consists in that the tool is connected with the handle by a universal joint and a clearance space is provided between the parts thus connected, in a manner such that the handle can be turned without impediment through a limited angle in different directions relatively to the tool. The arrangement is preferably realized in such manner, that the connecting joint will have its center in the axis of rotation of the tool, so that a pressure may be transferred to the tool in the axial direction thereof in all angular positions of the handle relatively to the tool.

The invention will be described more closely with reference to the accompanying drawing which illustrates two forms of embodiment of the invention. Figure 1 shows a so-called angle-piece, the bearing head of which is represented in section. Figure 2 shows the same angle-piece viewed from above. Figure 3 is a view similar to Fig. 1 showing the handle tilted with respect to the bitstock. Figure 4 is a view similar to Figure 3 of a modified form of the invention.

In the examples as illustrated, the angle-piece is of a construction known per se. It consists of a handle 1 in which is mounted a rotary link shaft terminating in a pinion which comprises a tubular member 2 having teeth 3 cut or milled out in the external end thereof. These teeth engage teeth 4 of a bearing sleeve 5 which is rotatably mounted in the head 6, and the axial direction of which extends at right angles to the axis of rotation of the pinion 2. The bearing sleeve is retained in place by means of a screw 7 threaded into the head, said screw having a central aperture of the same inner diameter as that of the bearing sleeve. The bitstock 8 of the bit 8' is secured in known manner in the bore head by means of a locking arm 9, which is rotatable about a screwstud 10, and which engages a narrower portion 12 of the bitstock by a recess 11 provided in one edge of the arm, so that the bit 8' cannot be displaced in its longitudinal direction. The bitstock is caused to rotate with the bearing sleeve 5 by means of a shoulder 13a on the sleeve engaging a recess 13 in the bitstock.

The portion 14 of the bitstock projecting outside the bore head is of a cylindrical shape, and is intended to be fitted into a guiding sleeve 15 of a parallel-guiding means not shown, which is adapted to render possible parallel displacement of the bore bit. To relieve this parallel guiding means of bending forces that might otherwise be transferred from the handle during the boring operation, the bitstock is, according to the invention, connected with the handle in a manner such as to facilitate free movement of the handle relatively to the bitstock in various directions within a limited angle. To this end there is provided a clearance 16 between the bitstock and the surrounding bearing sleeve, which clearance has been brought about in the example shown in Figs. 1 and 3 by imparting an outwardly tapering shape to the portion of the bitstock surrounded by the bearing sleeve. The shoulder 13a is loosely engaged with the recess 13 and thereby forms a universal joint connecting the bitstock and sleeve to render possible a free swinging movement of the handle relatively to the bore bit in different directions about a turning center coinciding approximately with the axis of rotation of the bore bit. By this arrangement the axial pressure required for the boring operation may be transferred in the ordinary way from the handle to the bore bit, without the latter and the guiding means thereof being subjected to detrimental bending stresses.

By using a tapered bitstock the advantage is gained that the desired mobility of the handle may be obtained without any alteration of the construction of the angle piece, it being thus possible to make use of angle pieces of ordinary standard construction. The same mobility may obviously also be obtained by imparting an outwardly flaring conical shape to the inside of the bearing sleeve 5a held by the screw 7a, as shown in Fig. 4, in which the flared interior of the sleeve is indicated at 16a. This arrangement affords the advantage that ordinary bore bits with bitstocks 8a of a cylindrical shape all over the length thereof may be made use of. Other modifications of the arrangement in question are also conceivable. For example, the bore bit may have a cylindrical bitstock, and may be mounted in the ordinary way in a cylindrical bearing sleeve, while instead, the bearing sleeve or the bearing head is pivotally connected to the handle in a manner permitting a similar free movement between the handle and the bore bit. In carrying out grinding work, grinding trundles are being used, the spindles of which are inserted into the angle piece in the same manner as the bore bit.

I claim:

1. A dental instrument comprising a handle, a tool holding bearing sleeve rotatably mounted in the handle, means for transmitting rotary motion through the handle to said sleeve, a tool mounted in said sleeve, a universal joint forming a driving connection between one end of said sleeve and said tool, the interior of said sleeve and the tool presenting a circular clearance space increasing in width from the first-mentioned end to the opposite end of said sleeve whereby the handle may be swung without impediment through a limited angle relative to the tool.

2. A dental instrument as claimed in claim 1, in which the tool shank has an outwardly tapering shape.

3. A dental instrument as claimed in claim 1, in which the inner surface of the bearing sleeve has an outwardly flared conical shape.

KARL AXEL SAM KARLSTRÖM